United States Patent [19]

Brunn

[11] Patent Number: 5,142,417
[45] Date of Patent: Aug. 25, 1992

[54] UNOBSTRUCTED ALL-REFLECTING TELESCOPES OF THE SCHIEFSPIEGLER TYPE

[76] Inventor: Michael Brunn, Schlesische Str. 27, W-3470 Hoexter 1, Fed. Rep. of Germany

[21] Appl. No.: 620,731

[22] Filed: Dec. 3, 1990

[30] Foreign Application Priority Data

Oct. 1, 1990 [DE] Fed. Rep. of Germany ....... 3943258

[51] Int. Cl.⁵ ............................................. G02B 17/06
[52] U.S. Cl. .................................................. 359/859
[58] Field of Search ............... 350/620, 619, 505, 442, 350/443

[56] References Cited

U.S. PATENT DOCUMENTS

| | | | |
|---|---|---|---|
| 4,265,510 | 5/1981 | Cook | 350/620 |
| 4,632,521 | 12/1986 | Kovsch | 350/505 |
| 4,737,021 | 4/1988 | Kovsch | 350/505 |
| 4,804,258 | 2/1989 | Kebo | 350/505 |
| 4,964,706 | 10/1990 | Cook | 350/620 |
| 4,993,818 | 2/1991 | Cook | 350/620 |
| 5,009,494 | 4/1991 | Iossi et al. | 350/620 |

*Primary Examiner*—Jon W. Henry

[57] ABSTRACT

An unobstructed four-mirror telescope having tilted components for astronomical observations. Favorite focal ratios are in the range of about F/12 to F/20 and all surfaces are rotationally symmetric. The systems off improved aberration correction and it is possible in special cases:
to realize all-spherical 500mm-systems.
to eliminate image plane tilt.
to eliminate anamorphic distortion.
to realize big diffraction limited fields ($\phi > 100$mm) free from coma, astigmatism and spherical aberration.

9 Claims, 3 Drawing Sheets

UNOBSTRUCTED ALL-REFLECTING TELESCOPES OF THE SCHIEFSPIEGLER TYPE

FIELD OF THE INVENTION

The invention relates to reflecting telescopes for astronomical use and particularly to an unobstructed Schiefspiegler type telescope with four tilted reflecting surfaces having improved coma and astigmatism correction including the possibility to eliminate image plane tilt.

BACKGROUND OF THE INVENTION

Because of the damaging effects on contrast rendition by obstructions in the light path of a telescope, several attempts have been made to design easy-to-make and collimate unobstructed telescopes comprising tilted rotationally symmetric optical elements.

Telescopes with tilted components have been described in the following publications:
1. A. Kutter, Der Schiefspiegler, 1953 (Abstract: The Schiefspiegler, Bull. A, Sky Publ. Corp., Cambridge, Mass.)
2. R. A. Buchroeder, Technical Report No. 68, Opt. Sc. Center, Univ. of Ariz., 1971
3. R. A. Buchroeder and A. S. Leonard, A.O., Vol. 11, No. 7, 1972, p. 1649
4. A. S. Leonard, in Adv. Tel. Making. Techniques, Vol. 1, Willmann-Bell, 1986, p. 231 and systems with tilted components for laser-beam transmission in:
4. W. B. King, A.O., Vol. 13, 1974, p. 21
5. R. Gelles, O.E., Vol. 13, 1974, p. 534

In addition, more general prior art other than tilted component telescopes is given, for example, in the following publications:
1. U.S. Pat. No. 4,226,501
2. U.S. Pat. No. 4,265,510

The inherent advantage of the tilt-and-decenter philosophy is simplicity itself. Each optical element is rotationally-symmetric and is being treated during the design and fabrication as an independent unit. The origins of local coordinate systems and the vertices of the surfaces coincide. Tilted-component systems do not have an optical axis in the common sense. Instead, it is defined by a ray joining an object point and subsequently the vertices of the optical elements and an image point. The tilt aberrations are cancelled in such a way that the individual elements of the optical systems are arranged to make the sum of the aberrations zero or at least as small as necessary, instead of deducing solutions from already known systems or using a predetermined geometry.

It follows from this kind of aberration correction that no predetermined geometry like certain radii of curvature, air spacings or tilt angles exists. Most of the surfaces to be made are spherical and their radii of curvature must not be necessarily closely kept. Resulting additional aberrations can be cancelled during collimation by changing distances and/or tilts without any disadvantage.

Until now there have been introduced in the tilted-component class: the Schiefspieglers with concave primary and convex secondary by A. Kutter; the Yolo-systems as well as the Solano reflector with concave primarys and concave secon-darys by A. S. Leonard (R. A. Buchroeder, "Design Examples of TCT's", OSC Rep. #68, 1971); furthermore, three-mirror Schiefspieglers by R. A. Buchroeder and A. Kutter and several catadioptric systems (ibidem).

Despite these efforts, a closer examination of the proposed optical systems indicates that each of them shows one or more of the following disadvantages:
1. Residual aberrations, i.e. only systems with moderate entrance pupil diameters could be realized.
2. An unfavourable position of the focal surface.
3. A reversed image because of an odd number of reflections.
4. Toroidal surface figures are needed.
5. A tilted image plane.
6. Anamorphic distortion
7. Surfaces with extremely long focal length.

To overcome the third of the above mentioned drawbacks some users of the three-mirror Schiefspieglers added a plane mirror. However, a fourth mirror offers further degrees of freedom to improve on the known systems.

SUMMARY OF THE INVENTION

The present invention provides an improved, four mirror Schiefspiegler type telescope primarily intended for visual use. The mirrors are rotationally symmetric and arranged so that the system operates unobstructed.

It is another object of the invention to provide families of Schiefspiegler type telescopes having improved coma and astigmatism correction as well as eliminated image plane tilt.

More specifically, the invention combines in a favourable manner up to 14 of the following demands which formerly could be realized only partly:

1. An unobstructed light path in order to achieve a maximum of contrast rendition and resolving power.
2. The focal plane position should be readily accessible and as close to the telescopes center of gravity as possible.
3. A slow focal ratio ($\approx$F/15 to $\approx$F/20) in order to achieve high magnifications with long focus eyepieces and long eye relief. This also suppresses aberrations that may, otherwise, be introduced by prism type binocular viewers.
4. A relatively short (secondary) tube, less than 40% of the effective focal length.
5. No extreme long radii of curvature of any of the mirrors involved.
6. The surfaces should be easy to manufacture, i.e. spherical wherever possible.
7. Tolerances should be loose and collimation easy without introducing optical disadvantages. Thus, telescopes of the tilted component class had to be chosen.
8. Aberrations should be better corrected as in the prior art systems to make bigger telescopes possible.
9. Light should be reflected four times to obtain an astronomical image orientation.
10. It should be possible to minimize or even eliminate image plane tilt and/or
11. distortion.
12. A convex surface should have a concave counterpart to avoid manufacture of an additional master surface for testing.
13. Complete blocking of stray light should be possible without vignetting or extending the tube.
14. The systems should be completely free from chromatic aberrations, i.e. reflecting surfaces had to be used throughout to make the instruments in any spectral range usable.

15. The systems should be equipped with concave primary and convex secondary mirrors because coma astigmatism and spherical aberration tend to cancel each other, i.e. Schiefspiegler type systems.

The only limitation of the invention with respect to the goals listed above is that distortion and image plane tilt cannot be eliminated simultaneously with four rotationally symmetric mirrors. However, it looks only a little attractive in case of remaining distortion to introduce either further optical elements or complicated surface deformations in view of an aberration that can hardly be detected visually and otherwise be processed out.

BRIEF DESCRIPTION OF THE FIGURES

Any of the Tetra-Schiefspieglers below should be regarded as a member of a family emphasizing different design goals.

| Notes: | Distances $e_n$ are to the right: | $e_a > 0$. |
|---|---|---|
| | Tilts $a_n$ are counterclockwise: | $a_n > 0$. |
| | Radii of curvature $R_n$ have centers at the right: | $R_n > 0$. |
| | Conic constants: | $CC = k_n = -(\text{Eccentricity})^2$ |

DESCRIPTION OF PREFERRED EMBODIMENTS

Figure 1:
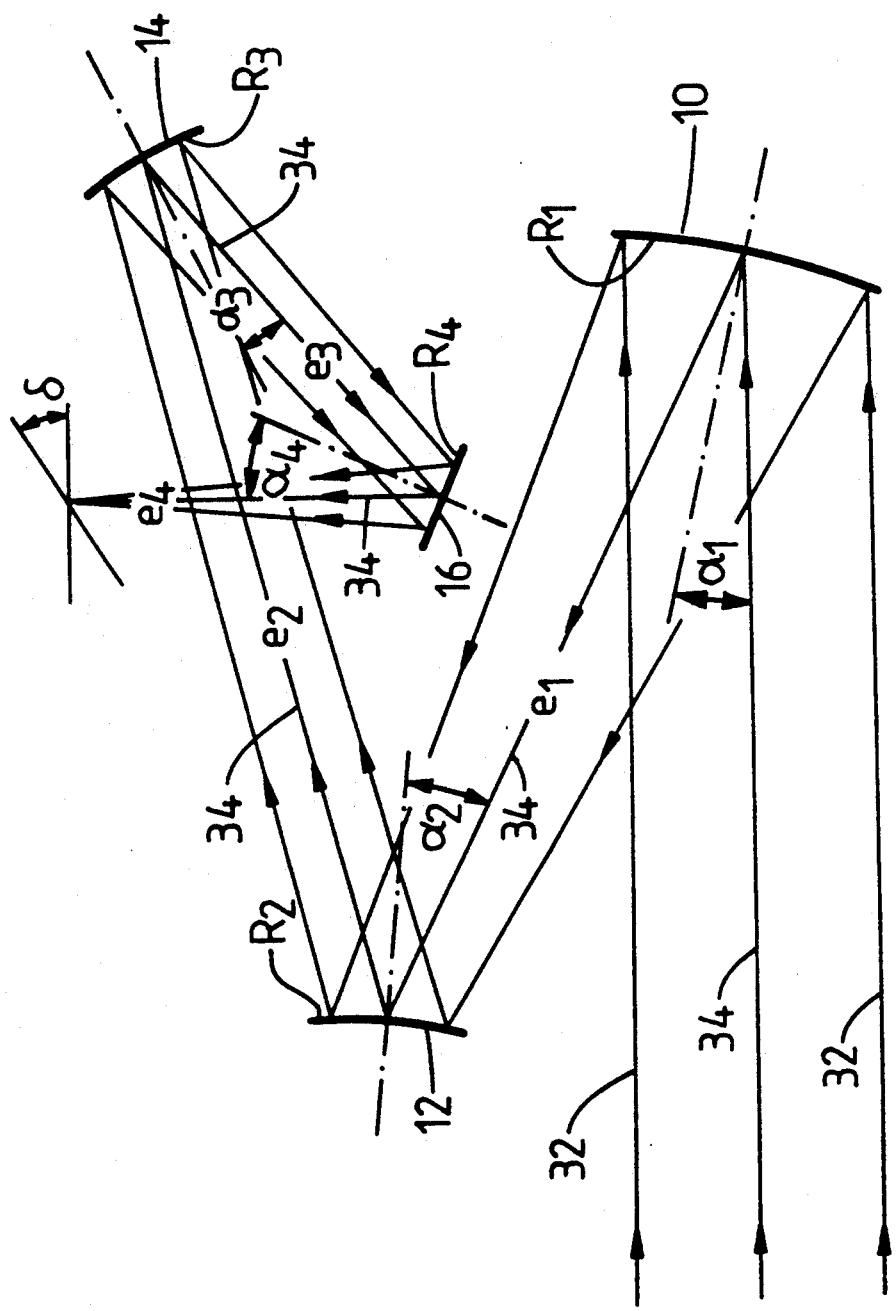
FIG. 1: is a schematic meridional sectional view of an unobstructed optical system in accordance with the teaching of the present invention.

At first, the characteristics common to all Schiefspieglers whether three or four mirrors are involved will be described (FIG. 1).

A concave primary mirror 10 having a focal ratio of about F/10 or slower is tilted in such a way that the convex secondary mirror 12 intersects the light coming from the primary just outside the parallel incoming beam, 32 and 34. The distance $e_1$ between both mirrors should lie in the range from about 0.4 to about 0.6 times the primarys focal length. The secondary 12 and the concave tertiary mirror 14 must be tilted opposite to the primary to find successful solutions. For practical purposes, the tertiary 14 should be located near the primary mirror 10 and its tilt angle $a_3$ should be less than 25 degrees or, for best results, approximately in the range 15 degrees or less in order to limit off-axis aberrations, especially astigmatism which has been the most damaging fault in the prior art systems. Thus, two principle solutions result for unobstructed four-mirror configurations.

Figure 2:
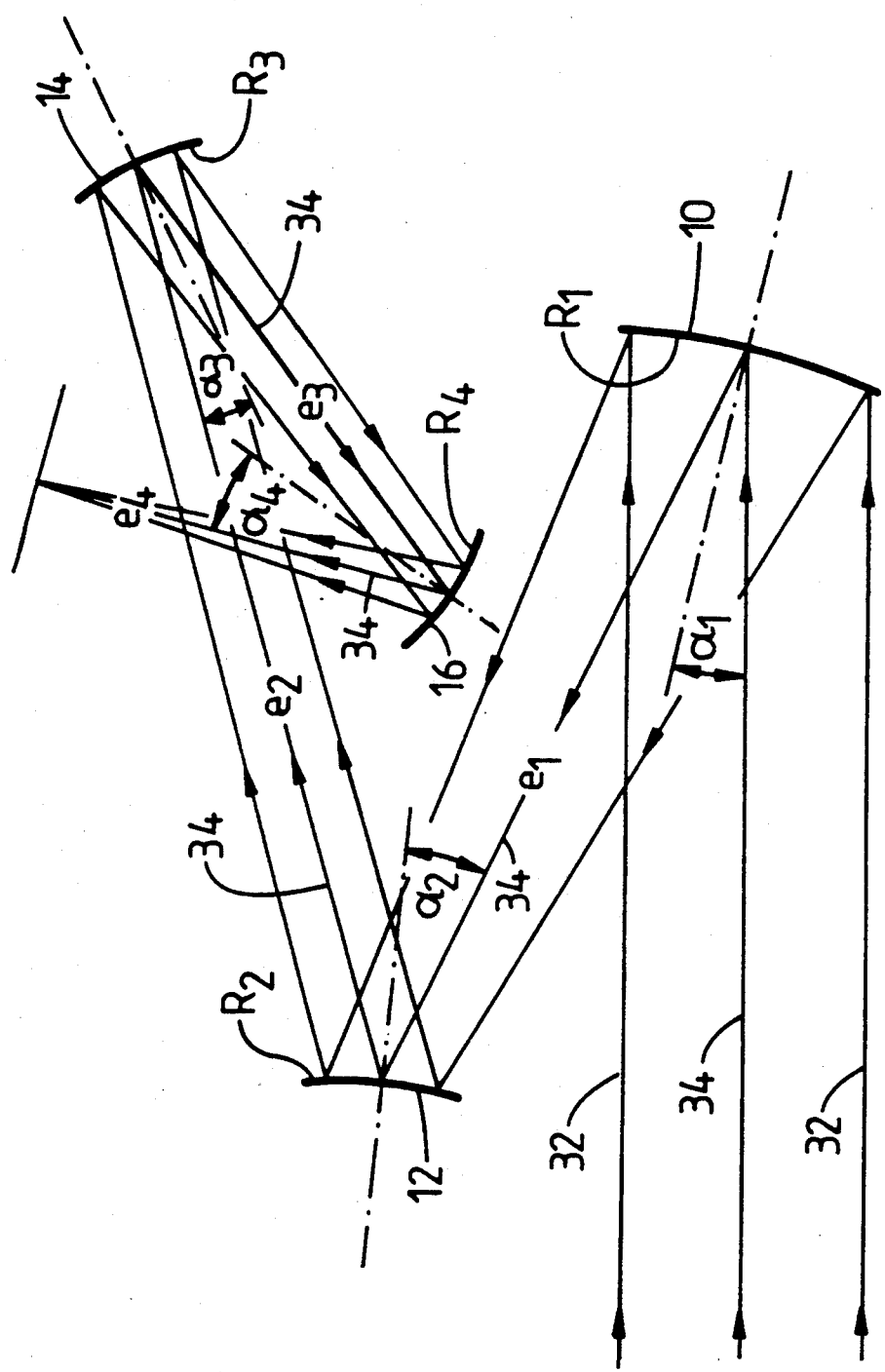
FIG. 2: is a schematic meridional sectional view of a second unobstructed optical system in accordance with the teaching of the present invention.
Figure 3:
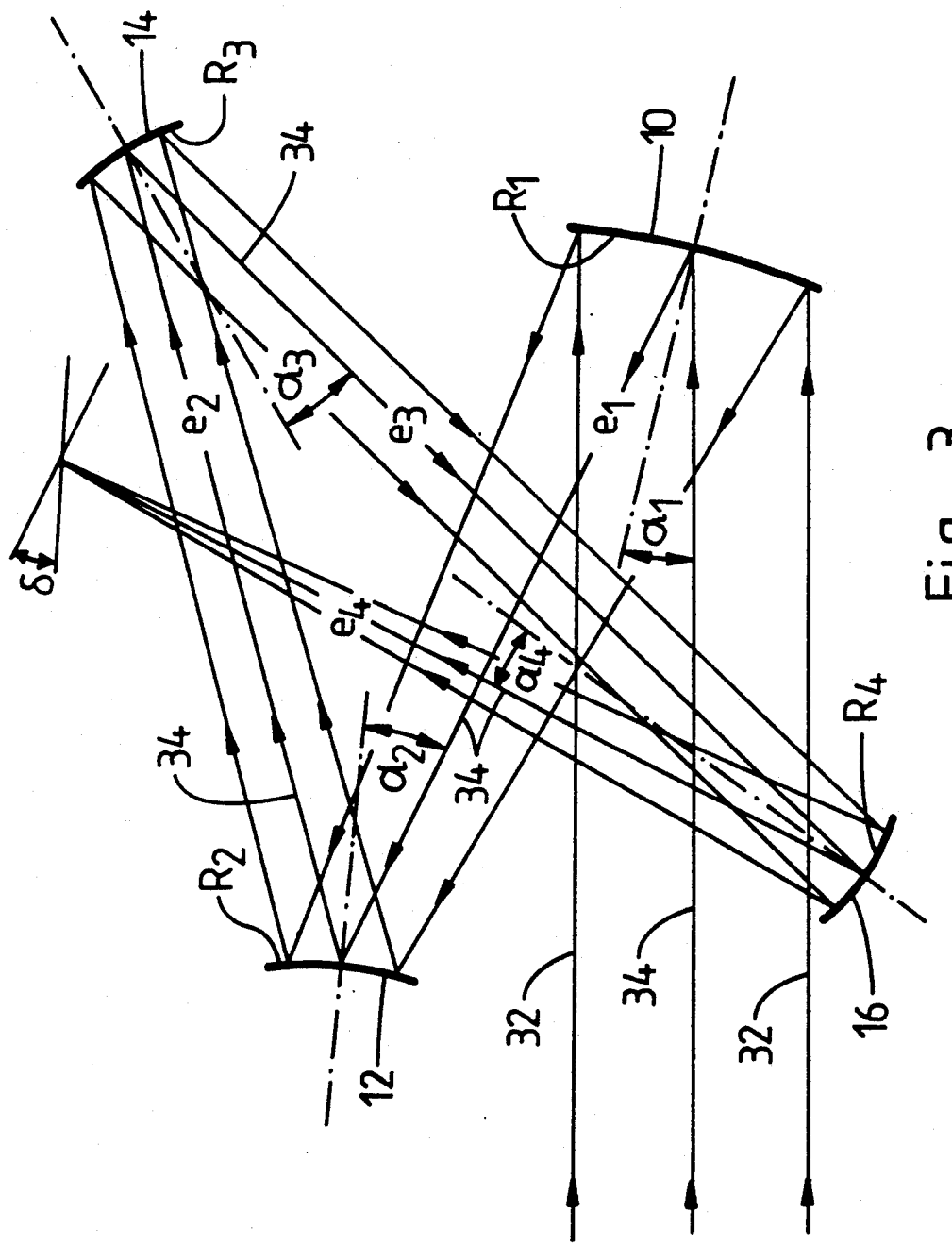
FIG. 3: is a schematic meridional sectional view of a third unobstructed optical system in accordance with the teaching of the present invention.

Firstly, the triangular room unaffected by rays between the vertices of the first three mirrors 10, 12 and 14 or, secondly, the room on the other side of the incoming beams opposite to the tertiary 14 can be used to arrange a fourth surface 16 obstruction-free. In both cases, solutions exist with plane, concave and convex fourth mirrors. FIGS. 1 to 3 show examples. If further means, such as a three-dimensional arrangement or nonrotationally symmetric surfaces, are included into consideration than many more solutions are possible.

In order to obtain an approximate pre-design the following expressions can be used. They sum up the amounts of coma 'C' and astigmatism 'A' introduced by the four tilted mirrors and give as results the extensions of a blurred on-axis image 'point' in seconds of arc:

$$A = \frac{825060}{y_1} \sum_{n=1}^{4} \frac{y_n^2}{R_n} \left[ \frac{1}{\cos a_n} - 1 \right]$$

$$C = 10800 \left[ a_1 \frac{r_1^2}{R_1^2} - \sum_{n=2}^{4} \frac{a_n * y_n^3}{R_n * y_1} \left[ \frac{1}{P_n} + \frac{1}{R_n} \right] \right].$$

In these equations signs are for an unfolded optical system, radii of curvature $R_n \neq 0$, ray highs $y_n > 0$, object distances $P_n$ between the vertices of said mirrors and the virtual foci must be $> 0$, and tilt angles are in the range $-90° < a_n < +90°$.

FIG. 1 and table 1 illustrate the first preferred embodiment of Tetra-Schiefspieglers.

TABLE 1

Prescription of a specific embodiment
Design #35, ⌀ 500 mm F/19.0

| # | Description | Radius | CC | Distance | Tilt |
|---|---|---|---|---|---|
| 10 | Primary Mirror | −14000 | 0 | −3600 | −3.2468° |
| 12 | Secondary Mirror | −13000 | 0 | 3600 | 7.2660° |
| 14 | Tertiary Mirror | −13000 | 0 | −1200 | 6.8180° |
| 16 | Quaternary Mirror | ∞ | 0 | 1086.42 | 34.0000° |

Focal plane tilt: 7.8°

Dimensions in millimeters unless otherwise noted
(−) Distances are to the right
(−) Radii have centers to the right
(−) Tilts are counterclockwise
CC = k = Conic Constant = −(Eccentricity)²

Using the increased degrees of freedom provided by the plane, fourth mirror 16 off-axis astigmatism could be reduced. It can be stated, with the average amateur telescope maker in view, that such a system is easy to make in any practicable size. No master surfaces are necessary. The convex secondary 12 and the concave tertiary mirror 14 can be made simultaneously from blanks of the same size and tested by interference and the flat 16 can be tested in combination with one of the concave mirrors. In addition, the flat 16 may actually be a sphere with extremely long focal length, further facilitating the making. Because of the simple tilt-and-decenter philosophy any aberration additionally introduced by the 'flat' will be completely eliminated during the collimation procedure. However, to realize a variable tilt angle of the fourth mirror 16 for convenience in observing at various zenith distances, a true flat must be used. If necessary, spherical aberration may be corrected by an elliptical deformation of the primary using conic constant $k_1 = -0.6$.

Table 2 and FIG. 1 prescribe a member of the second family of preferred embodiments. A 1020 mm-Schiefspiegler has been beyond the limits until now because of prohibitively strong residual aberrations. In comparison to a refractor (F/15), this Schiefspiegler would have less than half of its length, a secondary tube with approximately halved diameter (excluding the short primary tube) and an image absolutely free from chromatic aberrations. In the design process air spacings $e_n$, radii of curvature $R_n$ and tilts $a_n$ have been chosen in order to eliminate off-axis astigmatism. Afterwards, aspherization of primary mirror 10 and secondary mirror 12 has been used to eliminate field coma, too. A design like this may be of interest if image plane tilt and distortion are not harmful and a highly corrected unobstructed image is needed.

TABLE 2

Prescription of a specific embodiment
Design #154, φ 1020 mm F/17.3

| # | Description | Radius | CC | Distance | Tilt |
|---|---|---|---|---|---|
| 10 | Primary Mirror | −26000 | −1.36 | −7200 | −3.2656° |
| 12 | Secondary Mirror | −16800 | −5.10 | 7200 | 6.5950° |
| 14 | Tertiary Mirror | −16800 | 0 | −2800 | 4.8610° |
| 16 | Quaternary Mirror | ∞ | 0 | 2061.11 | 36.5000° |

Focal plane tilt: 9.1°

Dimensions in millimeters unless otherwise noted.
(−) Distances are to the right
(−) Radii have centers to the right
(−) Tilts are counterclockwise
CC = k = Conic Constant = −(Eccentricity)²

FIG. 2 and table 3 represent Tetra-Schiefspieglers using the fourth mirror 16 to eliminate image plane tilt.

TABLE 3

Prescription of a specific embodiment
Design #37, φ 255 mm F/20.5

| # | Description | Radius | CC | Distance | Tilt |
|---|---|---|---|---|---|
| 10 | Primary Mirror | −7550 | −.50 | −1800 | −3.3829° |
| 12 | Secondary Mirror | −7550 | 0 | 1800 | 8.9200° |
| 14 | Tertiary Mirror | −15000 | 0 | −780 | 5.4400° |
| 16 | Quaternary Mirror | 13000 | 0 | 869.79 | 23.3800° |

Focal plane tilt: 0°

Dimensions in millimeters unless otherwise noted.
(−) Distances are to the right
(−) Radii have centers to the right
(−) Tilts are counterclockwise
CC = k = Conic Constant = −(Eccentricity)²

Considerably faster systems up to F/12.6 have been designed. However, the systems should be slow and the tilt angle of the fourth mirror 16 small, that means less than about 25 degrees to control off-axis aberrations.

A specific embodiment of a Tetra-Schiefspiegler representing a typical compromise between the conflicting demands of tube length, focal ratio, image plane tilt correction of field aberrations and so on is given by FIG. 2 and the following table:

TABLE 4

Prescription of a specific embodiment
Design #153, φ 510 mm F/13.9

| # | Description | Radius | CC | Distance | Tilt |
|---|---|---|---|---|---|
| 10 | Primary Mirror | −12000 | −.50 | −2780 | −4.4905° |
| 12 | Secondary Mirror | −13000 | 0 | 2780 | 11.3500° |
| 14 | Tertiary Mirror | −16000 | 0 | −1160 | 7.5100° |
| 16 | Quaternary Mirror | 17000 | 0 | 1144.58 | 23.3900° |

Focal plane tilt: 1.0°

Dimensions in millimeters unless otherwise noted.
(−) Distances are to the right
(−) Radii have centers to the right
(−) Tilts are counterclockwise
CC = k = Conic Constant = −(Eccentricity)²

FIG. 3 and table 5 illustrate an embodiment of a further preferred design family. The system is a compact

TABLE 5

Prescription of a specific embodiment
Design #151, φ 510 mm F/25.2

| # | Description | Radius | CC | Distance | Tilt |
|---|---|---|---|---|---|
| 10 | Primary Mirror | −14000 | −.37 | −3000 | −4.1571° |
| 12 | Secondary Mirror | −12000 | 0 | 3000 | 7.5800° |
| 14 | Tertiary Mirror | −46000 | 0 | −3000 | 8.6600° |
| 16 | Quaternary Mirror | 40000 | 0 | 2956.16 | 4.9600° |

Focal plane tilt: 5.8°

Dimensions in millimeters unless otherwise noted.
(−) Distances are to the right
(−) Radii have centers to the right
(−) Tilts are counterclockwise
CC = k = Conic Constant = −(Eccentricity)²

510 mm-Tetra-Schiefspiegler of long focal length (tube length ≈ 0.25* F) with big field. Off-axis coma can be eliminated by aspherizing the primary ($k_1 \approx -1.6$) and the secondary ($k_2 \approx -7.1$), if an even bigger field is desired. Similar systems using flat as well as convex fourth mirrors have also been designed, but they are not superior to the solutions discussed.

The presently preferred embodiments have been described and it is clear to those skilled in the art that numerous modifications and embodiments of the invention exist. Therefore, the embodiments described above have to be understood illustratively rather than in a limiting sense.

What is claimed is:

1. A Schiefspiegler type telescope comprising:
   a) four rotationally symmetric mirrors, said mirrors forming a real image;
   b) an optical axis defined by a ray joining the vertices of said mirrors;
   c) said mirrors are tilted with respect to said optical axis and arranged so as not to obstruct the light path;
   d) a first, concave mirror being approximately in the range F/8 to F/16 and a second convex mirror arranged to intersect light reflected from said first mirror;
   e) the distance between said first and said second mirror being approximately in the range of 0.4 to 0.6 times the focal length of said first mirror;
   f) said second mirror is tilted in the opposite direction as said first mirror;
   g) a third concave mirror positioned near said first mirror to intersect light reflected from said second mirror;
   h) said mirrors arranged so that the following expressions which for a collimated incoming beam sum up the amounts of coma 'C' and astigmatism 'A' introduced by the four tilted mirrors, become approximately zero:

$$A = \frac{825060}{y_1} \sum_{n=1}^{4} \frac{y_n^2}{R_n} \left[ \frac{1}{\cos \alpha_n} - 1 \right]$$

$$C = 10800 \left[ \alpha_1 \frac{y_1^2}{R_1^2} + \sum_{n=2}^{4} \frac{\alpha_n * y_n^3}{R_n * y_1} \left[ \frac{1}{P_n} + \frac{1}{R_n} \right] \right].$$

wherein signs are for an unfolded optical system, radii of curvature $R_n \neq 0$, ray highs $Y_n > 0$, object distances $P_n$ between the vertices of said mirrors and the virtual foci must be $> 0$, tilt angles are in the range $-90° < \alpha_n < +90°$ and results are the extensions of a blurred image 'point' in seconds of arc;

i) the tilt angle between the normal of the vertex of said third mirror and said optical axis does not exceed 25 degrees;

j) a fourth mirror receiving the light from said tertiary mirror and reflecting the final image forming rays towards the focal surface.

2. A mirror system according to claim 1 wherein said third mirror reflects the light into the gap between the vertices of said first, second and third mirrors in order to arrange the fourth mirror there.

3. A mirror system according to claim 1 wherein said third and fourth mirrors are arranged on opposite sides of the beams incident on said first mirror.

4. A mirror system according to claims 2 or 3 wherein said fourth mirror is flat.

5. A mirror system according to claims 2 or 3 wherein said fourth mirror is concave.

6. A mirror system according to claims 2 or 3 wherein said fourth mirror is convex.

7. A mirror system according to claims 2 or 3 wherein a concave and a convex mirror have the same absolute radii of curvature.

8. A mirror system according to claims 2 or 3 wherein said first mirror and said second mirror have a conical reflective surface.

9. A mirror system according to claims 2 or 3 wherein said first, second, third and fourth mirrors are spherical including the case that the radius of curvature of one of the mirrors is infinite.

* * * * *